H. T. OLIVER.
CAMERA FOCUSING DEVICE.
APPLICATION FILED APR. 18, 1912.
1,095,285.
Patented May 5, 1914.
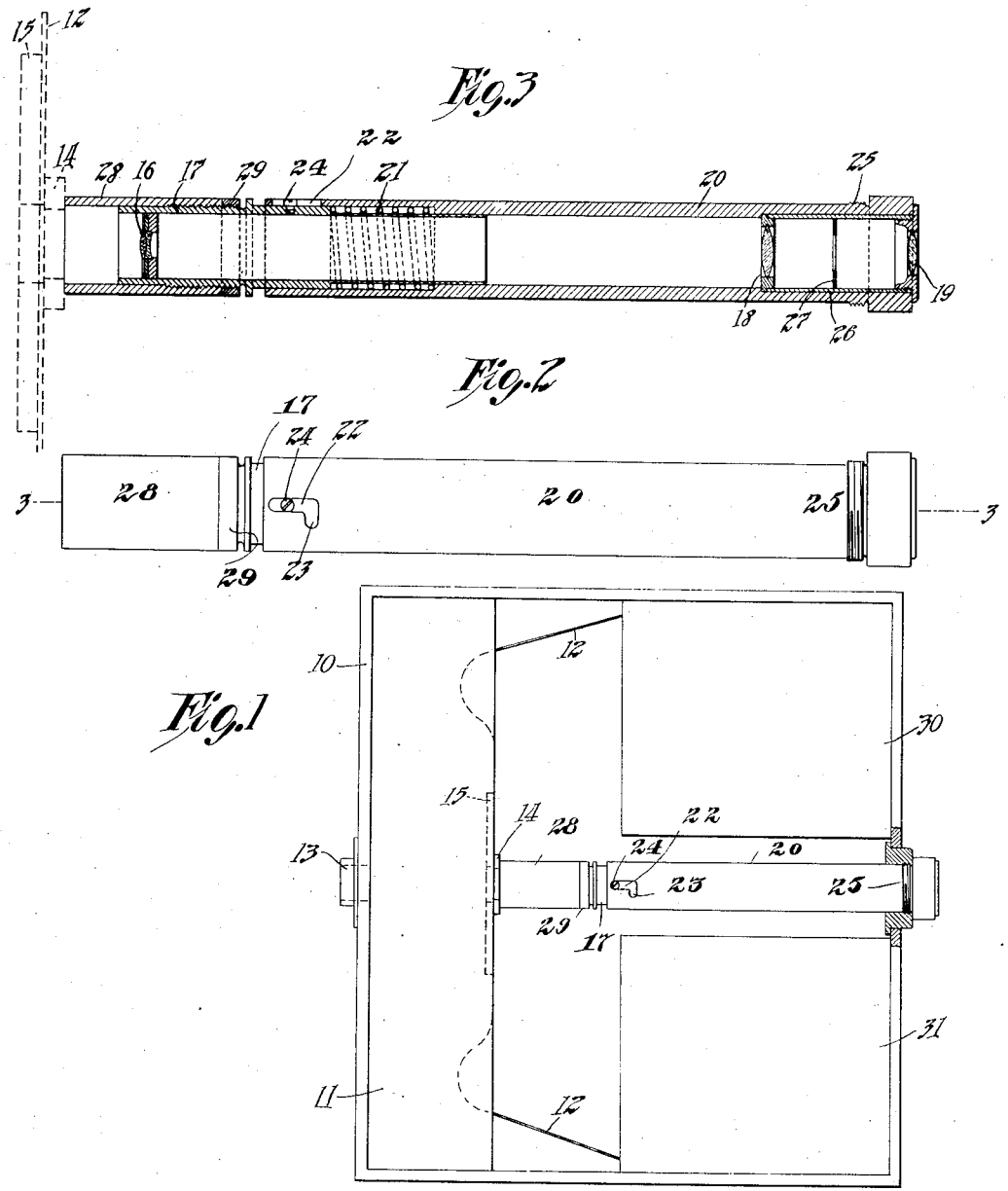

UNITED STATES PATENT OFFICE.

HENRY T. OLIVER, OF NEWARK, NEW JERSEY, ASSIGNOR, BY MESNE ASSIGNMENTS, TO NEW JERSEY PATENT COMPANY, OF WEST ORANGE, NEW JERSEY, A CORPORATION OF NEW JERSEY.

CAMERA-FOCUSING DEVICE.

1,095,285. Specification of Letters Patent. Patented May 5, 1914.

Application filed April 18, 1912. Serial No. 691,676.

*To all whom it may concern:*

Be it known that I, HENRY T. OLIVER, a citizen of the United States, residing at Newark, in the county of Essex, State of New Jersey, have invented certain new and useful Improvements in Camera-Focusing Devices; and I do declare the following to be a full, true, and exact description of the said invention, such as will enable others skilled in the art to which it appertains to make use of the same.

In taking a photograph by means of a camera, the image of the object to be photographed is projected by the camera lens on to a sensitized plate. The photograph will not be sharp and clear unless all the rays of light coming from the same point of the object are brought by the lens to the same point in the sensitized surface of the plate or film. This is done by "focusing" the camera; that is, by shifting the lens and sensitized plate in relation with each other. The focusing is done ordinarily by placing a piece of ground glass with one of its surfaces approximately in the plane of exposure or that plane behind the lens which will be occupied by the sensitized surface when the photograph is taken, and changing the distance between the lens and ground glass till the image of the object appears clear and distinct on the glass. The sensitized surface is then substituted for the ground glass and the exposure made. With the ground glass, however, it is very difficult to tell just when the image is in focus, since the image is partially reflected from both surfaces of the glass and moreover, it is very difficult to place the ground surface of the glass exactly in the plane where the image should fall in the sensitized material to give an "in-focus" picture. This sensitized material has some thickness and the image should be focused on a plane somewhere within this thickness to give the best results. This plane I call the "chemical focus." These difficulties are not so apparent in ordinary cameras, taking large pictures and using lenses of comparatively large focus. In such cameras a small fraction of an inch difference between the "chemical focus" and apparent focus, as seen on the ground glass, does not materially throw the protograph out of focus. But when the lens is short focused, as for instance, in a motion picture camera, the same lineal differences become proportionally large and must therefore be avoided, if sharp pictures are to be obtained. Moreover, with small images, the operator has greater difficulty in determining when the image is sharply defined. I overcome these difficulties by providing as a focusing device, a microscope, which not only enlarges the image formed at the plane of exposure, but is so arranged that when the image seen through the microscope is sharp and clear, the operator knows that there is a sharp and clear image being formed at the "chemical" focus of the camera; that is, that the camera is truly in focus. I do this by eliminating the usual ground glass or other translucent body on which the image is formed, and pass the rays which form the image in the plane of exposure directly into my microscope. The image formed at the plane of exposure is a real one, but invisible directly to the eye of an observer, because the rays forming it do not pass into the eye at the correct angles. I have called this image the "aerial image." The objective of the microscope is located at a fixed distance from the proper plane of exposure or the "chemical focus", as determined by experiment, so as to gather the rays forming an image there and transmit them to the eye piece of the miscroscope. The whole system is so arranged that a sharp and clear image is seen through the eye piece only when the image formed by the photographic lens falls at the chemical focus. That is, if the aerial image falls in front of the "chemical focus", the image is formed too far away from the objective to enable the rays forming it to be brought by the objective into focus at the eye piece. To bring the camera into focus the photographic lens is then brought nearer to the "chemical focus", until the image appears clear at the eye piece. The operator then knows that the aerial image is being formed in the "chemical focus" and that the camera is in focus.

It will be understood, of course, that every camera is provided with a locating device for the sensitized plate or film, so that the "chemical focus" of any camera always lies in the same plane. In a motion picture camera, which I have chosen for purposes of illustration, this locating device is an exposure plate fixed in the camera, and the film is placed back of this plate, being held against it by a gate, and the picture is taken through an opening in the exposure plate. As motion picture cameras usually use very short focused lenses and take very small pictures, I have shown my microscope focusing device as employed in such a camera, but it is to be understood that it may be used in any type of camera.

In the drawings, Figure 1 is a side elevation of a motion picture camera with the usual side door removed, and the camera partially in section. Fig. 2 is a side elevation of the microscope and Fig. 3 is a section of the microscope on the line 3—3, of Fig. 2 showing parts of the camera in broken lines.

The corresponding parts are referred to both in the drawings and the following description by similar reference characters.

In the drawings, 10 represents generally the case of a motion picture camera of a usual type, having a compartment 11 containing mechanism for moving the film 12 past the photographic lens contained in a tube 13. A plate or gate 14 is provided, which holds the film against an exposure plate 15, containing an aperture to determine the outlines of the photograph to be taken. The plate 14 is attached to the exposure plate 15 and has a definite relation thereto, and to the photographic lens in the tube 13. Ordinarily plate 14 would contain a piece of ground glass on which would be projected the image of the object to be photographed and the tube 13 would be adjusted so as to bring this image to sharp definition on the ground glass, as observed by the camera operator. In my device, there is no ground glass, but merely an opening in the plate 14, directly behind the opening in the exposure plate 15 and in line with the optical center of the photographic lens in tube 13.

My focusing device consists of a microscope, shown specifically in Figs. 2 and 3, having its optical axis in line with the optical axis of the photographic lens. This microscope has an objective 16 in a tube 17 and a compound eye piece having the lenses 18—19 in a tube 20. The tube 20 is telescoped on the tube 17, and a spring 21 is provided abutting against shoulders provided on the two tubes adjacent the ends thereof, as shown in Fig. 3. The tube 20 is provided with a longitudinal slot 22 having a portion 23 at right angles to the main slot 22. A screw 24 is attached to the tube 17 with its head lying in the slot 22. The tube 20 is provided with screw threads 25 by which it may be attached to the camera case 10 and the eye piece lenses 18—19 are mounted in a tube 26 fitting in the tube 20. The tube 26 is provided with a diaphragm 27 of the well-known construction. The tube 17 is externally threaded and connected to it by these threads is a tube 28 and a lock nut 29.

The objective of the microscope is placed in the camera at a fixed distance from the "chemical focus" or the correct plane of exposure, so that the objective is focused upon the aerial image formed at the "chemical focus." The tube 28 and the lock nut 29 form an adjustable means by which this may be done, the microscope being moved into the camera against the plate 14 and the tube 28 being adjusted longitudinally on the microscope until the objective 16 is focused on the aerial image. The tube 28 is then locked in position by tightening the nut 29. The proper position of the objective is determined by setting up the camera and focusing the camera lens as nearly correct as it can be determined by the ordinary piece of ground glass, and a photograph taken with the lens in this position. The picture so taken is developed and magnified and if found to be not in focus, the camera lens is readjusted and another photograph taken. This is done repeatedly until the camera is exactly in focus. The tube 28 is then adjusted until the objective 16 is brought in such a relation to the aerial image now being formed at the "chemical focus" that the scene on which the camera is focused, is seen distinctly and clearly through the eye piece lenses 18—19. It is obvious that if the positioning member 28 is not disturbed thereafter, the camera may be focused on any scene by moving the photographic lens until the scene can be distinctly seen through the microscope, for it is only when the aerial image is in the plane of the "chemical focus" that it will be distinctly seen through the microscope.

I have illustrated the camera as having two film boxes 30 and 31 with the microscope lying between them. In some types of cameras, these film boxes are united, so that it is necessary to have the microscope removable from the camera after it has been focused in order to get the film box into place. For purposes of economy, it is also desirable that the same microscope may be used in different cameras. For these reasons I have provided the screw threads 25, so that by turning the microscope it may be withdrawn from the camera. Since the dimensions of the wooden box 10 may vary in different specimens of the same type of camera, I have provided the two-part tube 17—20, held apart by the spring 21. The spring 21 permits an adjustment in the total length of the microscope to take up variations in the distance between the exposure plate and the rear of the camera. I have provided the bayonet joint formed by slots 22—23 and the screw 24 so that the microscope may be easily inserted in a camera, and threads 25 screwed into place without having the tube 28 rub against the plate 14. The tube 17 is pushed into the tube 20, and turned to bring the screw 24 into the slot 23, thus locking the spring 21 against extension. The microscope is then screwed into place, when a slight turn of the tube 17 will bring the screw 24 into the slot 22 and permit the spring 21 to push the tube 28 against the plate 14.

I prefer to so shape my objective that the light rays forming the image in the plane of the " chemical focus " will be rendered parallel in passing down the tube of the microscope. If the objective is properly focused on this " chemical focus," as determined in the manner described above, no parallel rays will be sent to the eye piece unless the image formed by the camera lens falls in that plane. The eye piece lenses are arranged to bring only parallel rays into focus in the eye of the observer and, therefore, it is only where the aerial image falls in the " chemical focus," that a sharp and clear image is seen through the eye piece. Since the aerial image is an inverted one, and the compound eye piece 18—19 inverts the image, the aerial image viewed through the eye piece will appear erect, since the objective in the form I have just described, does not invert. It is obviously an advantage to be able to view the aerial image erect instead of inverted.

While I have illustrated a compound microscope as a form which I prefer, especially where the focusing is to be done from the rear of a relatively large box, it is obvious that with some types of cameras in which this large box is absent, a simple microscope may be used, so long as this simple microscope is placed in the camera in such a position that the aerial image formed at the " chemical focus " or the plane to be occupied by the sensitized surface on which the protograph is taken, will appear to be in focus when viewed through the microscope. It is also possible to use my device as a simple instrument to be held in the hands of the operator and placed against some fixed abutment in the camera, so as to bring the lens at a predetermined position from the plane of the aerial image formed at the " chemical focus," this distance having been determined by experiment as being the one which will give a distinct image at the eye piece when the camera lens is positioned to form a distinct image at the " chemical focus."

Having now described my invention, what I claim as new and desire to secure by Letters Patent is as follows:

1. In a camera focusing device, a microscope having an objective, an objective tube therefor, an eye piece, an eye piece tube, one of such tubes slidably mounted on the other, and a spring arranged to normally move said objective and eye piece away from each other, substantially as described.

2. In a camera focusing device, a microscope having an objective, an objective tube therefor, an eye piece, an eye piece tube, one of such tubes slidably mounted on the other, a spring arranged to normally move said objective and eye piece away from each other, and means to prevent the extension of the spring, substantially as described.

3. In a camera, a plate with an opening therein, an objective, an objective tube therefor, a member attached to the objective tube and adapted to contact with the said plate to position the objective in predetermined relation with the plane of exposure of the camera, an eye piece and a tube therefor, telescoping with said objective tube, and a spring arranged to normally move the eye piece tube and the objective tube longitudinally away from each other, substantially as described.

4. In a camera, a plate with an opening therein, an objective, an objective tube therefor, a member attached to the objective tube and adapted to contact with the said plate to position the objective in predetermined relation with the plane of exposure of the camera, an eye piece and tube therefor, telescoping with said objective tube, a spring arranged to normally move the eye piece tube and the objective tube longitudinally away from each other, and a stop to lock said tubes in fixed longitudinal relation, substantially as described.

5. In a device of the character described, a camera, a microscope removably attached to the camera and comprising an objective, a tube therefor, an eye piece and tube therefor telescoping with said objective tube, a spring arranged to normally hold said tubes extended longitudinally, an abutment in the camera adapted to contact with said objective tube and locate the objective in predetermined relation to the exposure plane of the camera, and means to connect the eye piece tube with the camera, substantially as described.

6. In a photographic camera, a photographic lens adapted and arranged to form at the plane of exposure, an aerial image of the object to be photographed and a microscope having its optical axis in line with the optical axis of the photographic lens, and having its objective at a fixed distance back of the plane of exposure, said objective being adapted and arranged to bring the rays forming said aerial image into parallel rays in the tube of said microscope, and an eye piece adapted and arranged to bring said parallel rays into focus in the eye, substantially as described.

7. In a camera focusing device, a microscope having an objective, an objective tube therefor, a positioning member adjustably connected with the objective tube, an eye piece, an eye piece tube, one of such tubes slidably mounted on the other, and means for normally moving said objective and eye piece away from each other, substantially as described.

8. In a camera focusing device, a microscope having an objective, an objective tube therefor, a positioning member adjustably connected with the objective tube, an eye piece, an eye piece tube, one of such tubes slidably mounted on the other, a spring arranged to normally move said objective and eye piece away from each other, and means to prevent the extension of the spring, substantially as described.

9. In a camera, a plate with an opening therein, an objective, an objective tube therefor, a member adjustably connected to the objective tube and adapted to contact with the said plate to position the objective in any desired predetermined relation with the plane of exposure of the camera, an eye piece, a tube therefor telescoping with said objective tube, and means for normally moving the eye piece tube and the objective tube longitudinally away from each other, substantially as described.

10. In a camera, a plate with an opening therein, an objective, an objective tube therefor, a member adjustably connected to the objective tube and adapted to contact with the said plate to position the objective in any desired predetermined relation with the plane of exposure of the camera, an eye piece, an eye piece tube telescoping with said objective tube, means for normally moving the eye piece tube and the objective tube longitudinally away from each other, and a stop to lock said tubes in fixed longitudinal relation against the action of said means, substantially as described.

11. In a photographic camera, a lens adapted and arranged to form at the plane of exposure an aerial image of the object to be photographed, and a microscope having its objective at a fixed distance back of the plane of exposure, said objective being adapted and arranged to bring the rays forming said aerial image into parallel rays in the tube of the microscope, and an eye piece adapted and arranged to bring said parallel rays into focus in the eye, substantially as described.

This specification signed and witnessed this 16th day of April 1912.

HENRY T. OLIVER.

Witnesses:
GEORGE G. SCULL,
M. LAWSON DYER.